(12) United States Patent
Li et al.

(10) Patent No.: US 7,856,150 B2
(45) Date of Patent: Dec. 21, 2010

(54) DENOISE METHOD ON IMAGE PYRAMID

(75) Inventors: Jian-Feng Li, Hangzhou (CN); Jin Wang, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 924 days.

(21) Appl. No.: 11/783,456

(22) Filed: Apr. 10, 2007

(65) Prior Publication Data

US 2008/0253678 A1 Oct. 16, 2008

(51) Int. Cl.
    *G06K 9/40* (2006.01)
(52) U.S. Cl. .................. 382/260; 382/254; 382/275; 382/240; 358/1.1; 358/3.26; 358/443; 358/463
(58) Field of Classification Search .................. None
    See application file for complete search history.

(56) References Cited

U.S. PATENT DOCUMENTS 7,515,763 B1* 4/2009 Zhong .................. 382/254
2004/0071363 A1* 4/2004 Kouri et al. .................. 382/276

OTHER PUBLICATIONS

Aiazzi et al., "Pyramid-Based Multiresolution Adaptive Filters for Additive and Multiplicative Image Noise",Aug. 1998, IEEE Transactions on Circuits And Systems—II: Analog And Digital Signal Processing, vol. 45, No. 8, pp. 1092-1097.*

Lukin, "A Multiresolution Approach for Improving Quality of Image Denoising Algorithms", 2006, IEEE International Conference on Acoustics, Speech and Signal Processing, ICASSP-2006.*

Buades et al., "A Review of Image Denoising Algorithms, With A New One", 2005, Society for Industrial and Applied Mathematics, vol. 4, No. 2, pp. 490-530.*

* cited by examiner

*Primary Examiner*—Sath V Perungavoor
*Assistant Examiner*—Jason Heidemann
(74) *Attorney, Agent, or Firm*—Bacon & Thomas, PLLC

(57) ABSTRACT

The present invention is to provide a denoise method on Gaussian/Laplacian image pyramid, which integrates Pyramid analysis/synthesis algorithm, MMSE (minimum mean square error) filter and NL (non local) filter on the image pyramid to reconstruct and output a denoised image of an original input image through a plurality of iterative procedures, and utilizes an auto-adaptive noise estimation algorithm to find parameter of noise level used by the NL filter, so as to be easily embedded in mobile or handheld devices for obtaining better noise removing and anti-shaking results and remove noise much faster than the conventional denoise method, but only with less quality loss.

10 Claims, 12 Drawing Sheets

DENOISE METHOD ON IMAGE PYRAMID

FIELD OF THE INVENTION

The present invention relates to a denoise method, more particularly to a method integrating pyramid analysis/synthesis algorithm, MMSE (minimum mean square error) filter, NL (non local) filter and an auto-adaptive noise estimation algorithm on Gaussian/Laplacian image pyramid, in order to be easily embedded in mobile or handheld devices for obtaining better noise removing and anti-shaking results and removing noise much faster than the conventional denoise method, but only with less quality loss.

PRIOR ART

An image with noise like the image shown on FIG. 1 is a corrupted binary (black and white) image of some letters, where 60% of the pixels are thrown away and replaced by random gray values ranging from black to white. In general, one goal in image restoration is to remove the noise from the image in such a way that the "original" image is discernible, which also means to decide which features existing on a very small scale in the image are noise and that removing these features while maintaining larger features might help "clean things up". One well-traveled approach is to smooth the image, the simplest approach is to replace each pixel by the average of the neighboring pixel values. Therefore, if an image has been smoothed a few times the image shown on FIG. 2 will be obtained; however, if the image has been smoothed many times, the image will then become vague as shown on FIG. 3.

In view of the images shown on FIGS. 2 and 3, it is obvious that the advantage of smoothing the images is able to mute out much of the spotty noise, while the disadvantage is that the sharp boundaries making up the letters have been smeared due to the averaging process. There are many more sophisticated approaches exist, the goal is the same: to remove the noise, and keep the real image sharp. The trick is to not do too much and to "know when to stop", which is also called "denoise".

General speaking, denoise is the process of removing noise from a signal. Denoise techniques are conceptually very similar regardless of the signal being processed, however a priori knowledge of the characteristics of an expected signal can mean the implementations of these techniques vary greatly depending on the type of signal. In all recording devices, both analogue and digital, have traits which make them susceptible to noise. Noise can be random or white noise with no coherence or coherent noise introduced by the devices mechanism or processing algorithms. A major form of noise is hiss caused by random electrons, which are heavily influenced by heat, stray from their designated path. These stray electrons influence the voltage of the output signal and thus create detectable noise. In the case of photographic film and magnetic tape, noise (both visual and aural) is introduced due to the grain structure of the medium. In photographic film, the size of the grains in the film (more sensitive film having larger sized grains) introduces noise. In magnetic tape, the larger the grains of the magnetic particles, usually ferric oxide or magnetite. The larger the grains, the more prone the medium is to noise introduced by the grain. To compensate for this, larger areas of film or magnetic tape may be used to lower the noise level to an acceptable point.

Images taken with both digital cameras and conventional film cameras will also pick up noise from a variety of sources. Many further uses of these images require that the noise will be (partially) removed—for aesthetic purposes as in artistic work or marketing, or for practical purposes such as computer vision. In salt and pepper noise (also known as random noise or independent noise), pixels in the image are vastly different in color from their surrounding pixels. The defining characteristic is that the color of a noisy pixel bears no relation to the color of surrounding pixels. Generally this type of noise will only affect a small number of image pixels. When viewed, the image contains dark and white dots, hence the term salt and pepper noise. Typical sources include flecks of dust on the lens or inside the camera, or with digital cameras, faulty CCD elements.

In Gaussian noise (dependent noise), an amount of noise is added to every part of the picture. Each pixel in the image will be changed from its original value by a (usually) small amount. Taking a plot of the amount of distortion of a pixel against the frequency with which it occurs produces a Gaussian distribution of noise. One method to remove noise is by convolving the original image with a mask. The Gaussian mask comprises elements determined by a Gaussian function. It gives the image a blurred appearance if the standard deviation of the mask is high, and has the effect of smearing out the value of a single pixel over an area of the image. This brings the value of each pixel into closer harmony with the value of its neighbours. Gaussian filtering works relatively well, but the blurring of edges can cause problems, particularly if the output is being fed into edge detection algorithms for computer vision applications. Averaging is a degenerate case of Gaussian filtering, where the function defining the mask values has an infinite standard deviation.

A median filter is an example of a non-linear filter and, if properly designed, is very good at preserving image detail. To run a median filter, it should:

1. consider each pixel in the image;

2. sort the neighbouring pixels into order based upon their intensities; and 3. replace the original value of the pixel with the median value from the list.

This type of filter is very good at removing salt and pepper noise from an image, and also causes very little blurring of edges, and hence is often used in computer vision applications. There are several software programs available designed to remove image noise, such as Noise Ninja and Neat Image. Some raster graphics editors, such as Adobe Photoshop and Helicon Filter, also feature denoise abilities. However, they are either too slow to be implemented on mobile and handheld devices, or able to remove too little noise and save only poor detail profile. Thus, removing noise from the original signal is still a challenging problem for those researchers devoted in developing denoise tool in mobile and handheld devices.

SUMMARY OF THE INVENTION

In view of the foregoing shortcomings of the prior art, the inventor of the present invention based on years of experience to conduct extensive researches and experiments and finally invented a denoise method on image pyramid.

A primary objective of the present invention is to provide the denoise method on image pyramid, which integrates four kernel algorithms, i.e. pyramid analysis/synthesis algorithm, MMSE (minimum mean square error) filter, NL (non local) filter and an auto-adaptive noise estimation algorithm on Gaussian/Laplacian image pyramid, so as to be easily embedded in mobile or handheld devices for obtaining better noise removing and anti-shaking results.

Another objective of the present invention is to provide the denoise method for removing noise the Gaussian/Laplacian image pyramid much faster than all current commercial denoise software while only with less quality loss.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

In general, a common characteristic of images is that neighboring pixels are highly correlated. To represent the image directly in terms of the pixel values is therefore inefficient since most of the encoded information is redundant. The first task in designing an efficient and compressed code is to find a representation which, in effect, decorrelates the image pixels and has been achieved through a predictive and transform technique for removing image correlation. This technique is noncausal, yet computations are relatively simple and local. The predicted value for each pixel is computed as a local weighted average, using a unimodal Gaussian-like (or related trimodal) weighting function centered on the pixel itself. The predicted values for all pixels are first obtained by convolving this weighting function with the image. The result is a lowpass filtered image which is then subtracted from the original image.

Figure 1:
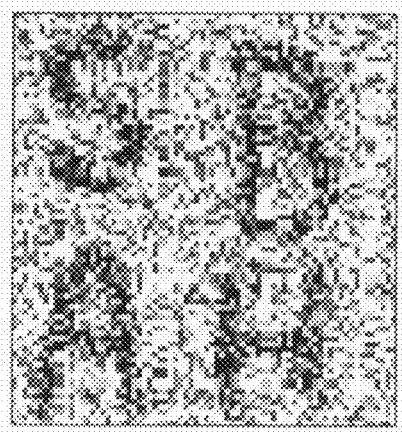
FIG. 1 is a corrupted binary (black and white) image of some letters with noise.
Figure 2:
FIG. 2 is the image shown in FIG. 1 after being smoothed a few times.
Figure 3:
FIG. 3 is the image shown in FIG. 1 after being smoothed many times.
Figure 4:
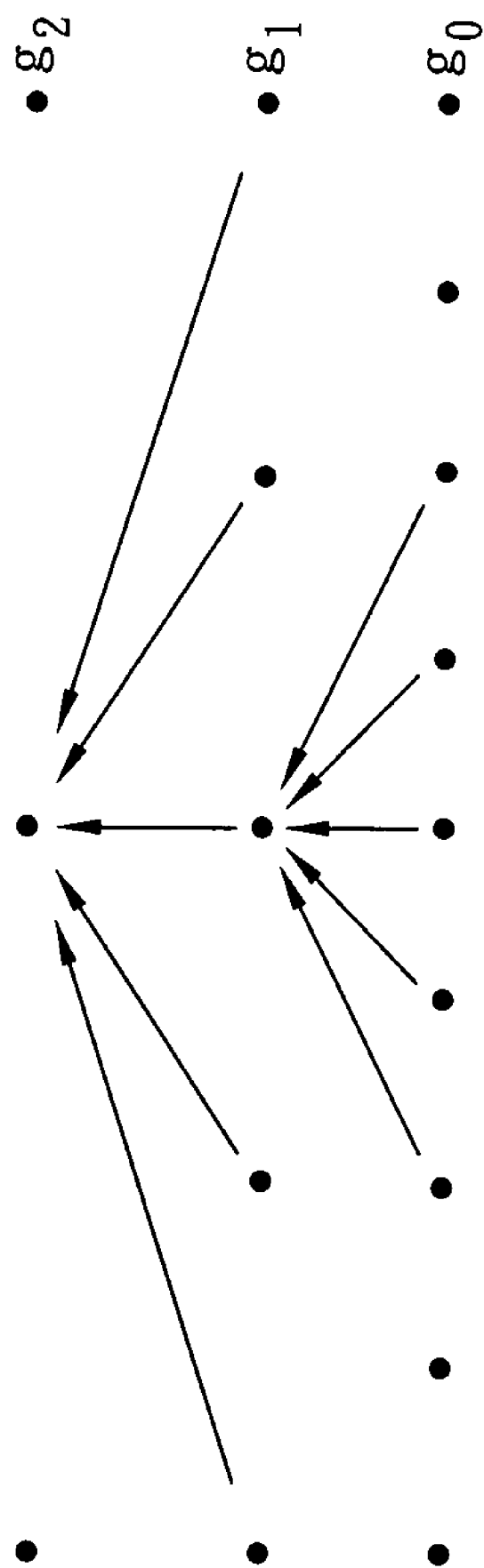
FIG. 4 is a schematic view of Gaussian pyramid.

In this technique, referring to FIG. 4, let $g_0(ij)$ be the original image, and $g_1(ij)$ be the result of applying an appropriate low-pass filter to $g_0(ij)$. A prediction error (or first error image) $L_0(ij)$ is then given by:

$$L_0(ij)=g_0(ij)-g_1(ij)$$

Rather than encode $g_0$, this technique encodes $L_0$ and $g_1$, which results in a net data compression because:

(1) $L_0$ is largely decorrelated, and so may be represented pixel by pixel with many fewer bits than $g_0$; and
(2) $g_1$ is low-pass filtered, and so may be encoded at a reduced sample rate.

Further data compression is achieved by iterating this process. The reduced image $g_1$ is itself low-pass filtered to yield $g_2$ and a second error image $L_1(ij)$ is obtained:

$$L_1(ij)=g_1(ij)-g_2(ij).$$

By repeating the iterative steps several times, a sequence of two-dimensional arrays $L_0, L_1, L_2, \ldots, L_n$ is obtained. In an implementation of this technique, each error image is smaller than its predecessor by a scale factor of ½ due to reduced sample density. If these arrays are stacked one above another, the result is a tapering pyramid data structure. The value at each node in the pyramid represents the difference between two Gaussian-like or related functions convolved with the original image. The difference between these two functions is similar to the "Laplacian" operators commonly used in image enhancement. Thus, this technique is commonly named as the Laplacian pyramid code. The coding scheme outlined above will be practical only if required filtering computations can be performed with an efficient algorithm.

The first step in Laplacian pyramid coding is to low-pass filter the original image $g_0$ to obtain the reduced image g1, which is a "reduced" version of $g_0$ in that both resolution and sample density are decreased. In a similar way, $g_2$ is created as a "reduced" version of $g_1$, and so on. Filtering is performed by a procedure equivalent to convolution with one of a family of local and symmetric weighting functions. An important member of this family resembles the Gaussian probability distribution, so the sequence of images $g_0, g_1, \ldots, g_n$ is called the Gaussian/Laplacian image pyramid (hereinafter referred to as "image pyramid").

While defining the image pyramid, it is supposed that the image is represented initially by the original image $g_0$ which contains M columns and N rows of pixels. Each pixel represents the luminance level at the corresponding image point by an integer I between 0 and 255. The original image $g_0$ becomes the bottom or zero level of the Gaussian/Laplacian pyramid. Pyramid level 1 contains the image $g_1$, which is a reduced or low-pass filtered version of $g_0$. Each value within level 1 is computed as a weighted average of values in level 0 within a predetermined square window, such as 5 pixels by 5 pixels. Each value within level 2, representing $g_2$, is then obtained from values within level 1 by applying the same pattern of weights. Again referring to FIG. 4, which illustrates a one-dimensional graphic representation of the process for generating a Gaussian pyramid, wherein each row of dots represents nodes within a level of the pyramid, the value of each node in the zero level is just the gray level of a corresponding image pixel, and the value of each node in a high level is the weighted average of node values in the next lower level. Note that node spacing doubles from level to level, while the same weighting pattern or "generating kernel" is used to generate all levels.

In an embodiment of the present invention, we apply a denoise method to image pyramid, of which the framework integrates the following kernel algorithms for being embedded in a mobile or handheld device and is illustrated on FIG. 4:

(1) Pyramid analysis/synthesis algorithm;

(2) MMSE filter and NL (non local) filter on pyramid; and (3) Auto-adaptive noise estimation algorithm on pyramid.

Figure 5:
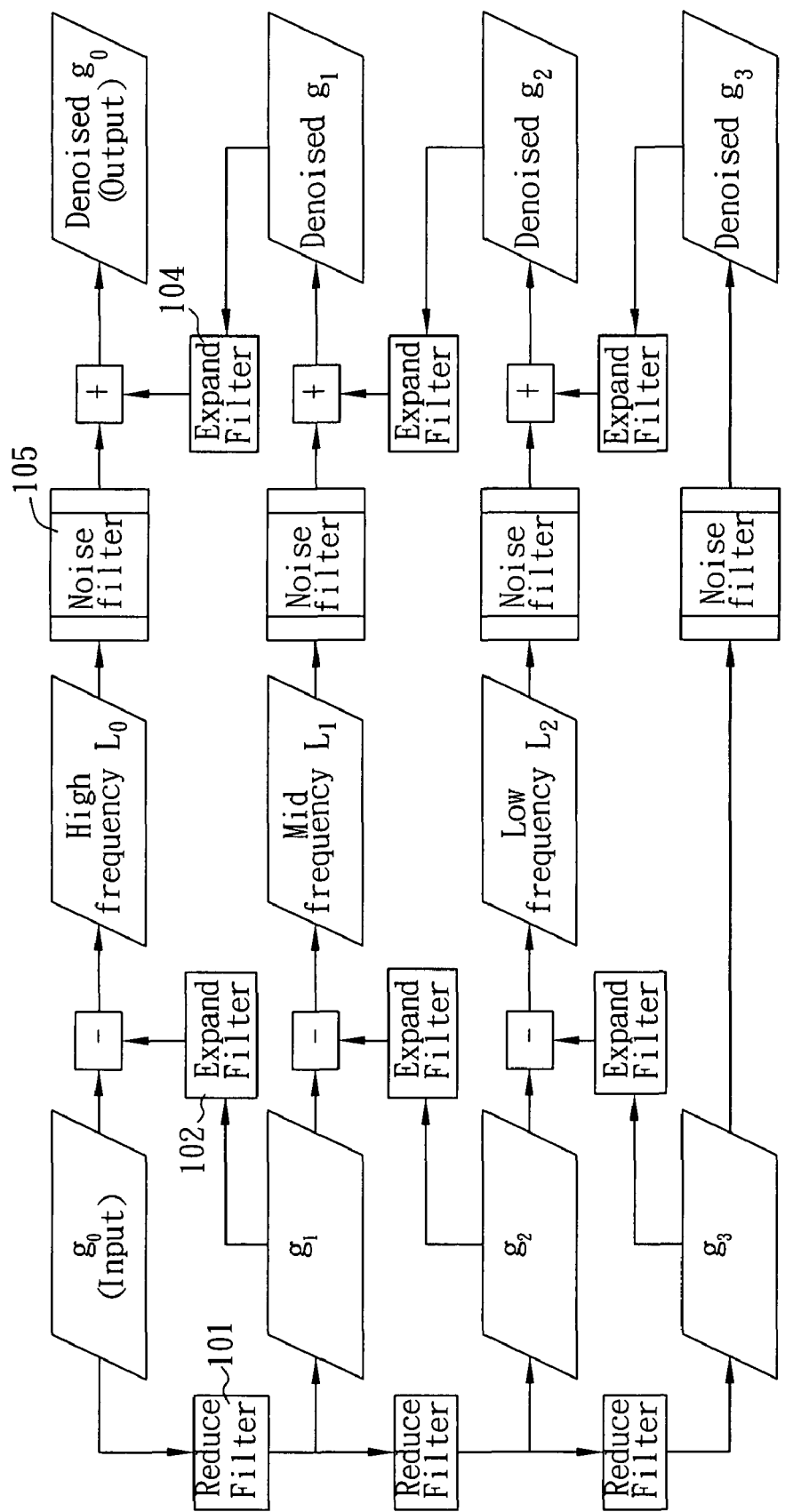
FIG. 5 is a schematic view of frame work of the denoise method according to the present invention.
Figure 6:
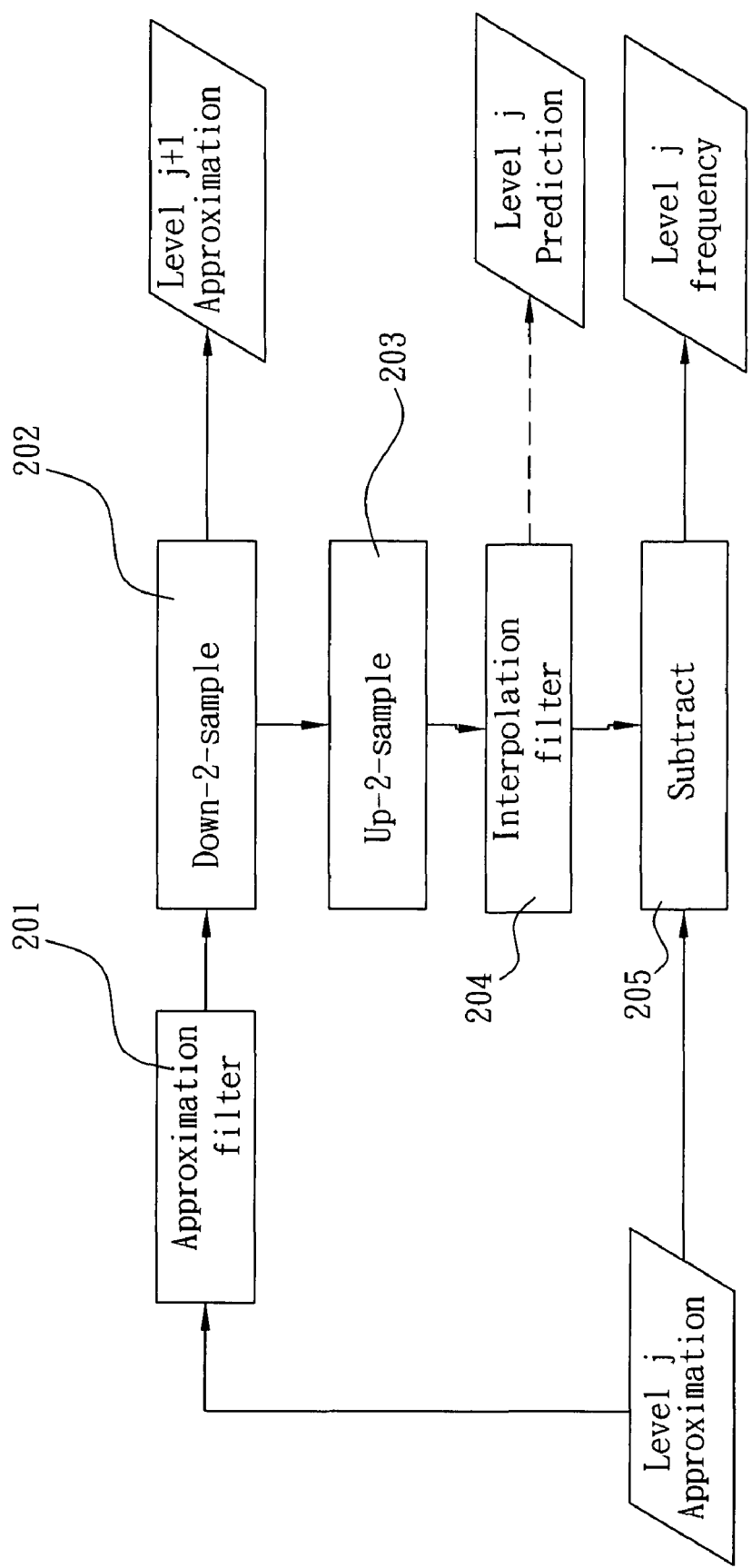
FIG. 6 is a schematic view of pyramid analysis in the denoise method according to the present invention.

As to the pyramid analysis/synthesis algorithm, it comprises pyramid analysis and pyramid synthesis, wherein the pyramid analysis is used to compute approximation pyramid (also called reduced images as mentioned above) and frequency pyramid (also called error images as mentioned above) of an original image captured by the mobile or handheld device in an iterative fashion, as referring to FIGS. 5 and 6, of which each iterative procedure comprises the following steps:

(201) computing a reduced-resolution approximation (denoted as level j+1, hereinafter taking j=0 as an example for detailedly explaining an iterative procedure) of an original input image (denoted as level j) $g_0$ with the resolution of M*N pixels, which is done by using a reduce filter 101 to zoom in the original input image $g_0$;

(202) down-sampling the original input image $g_0$ with the resolution of M*N pixels by the reduce filter 101 through using a factor of 2 to zoom in the original input image $g_0$ two times and obtain a Level j+1 approximation image $g_1$ with the resolution of M*N/4 pixels;

(203) up-sampling the Level j+1 approximation image $g_1$ with the resolution of M*N/4 pixels by a first expand filter 102 through using a factor of 2 to zoom out the image $g_1$ two times;

(204) creating an up-sampled Level j+1 approximation image $g_1$ with the same resolution of M*N pixels as the original input image $g_0$ by the first expand filter 102 through using a first interpolation, wherein the up-sampled Level j+1 approximation image $g_1$ is a first Level j prediction image of the original input image $g_0$; and (205) computing the difference between the first Level j prediction image and the original input image $g_0$, which is denoted as level j 0=0) high frequency $L_0$ and can be used to reconstruct progressively the original input image $g_0$ in subsequent procedures.

By repeating the above iterative steps several times, a sequence of Level j+1 approximation image $g_1$, Level j+2 approximation image $g_2$, and Level j+3 approximation image $g_3$ is obtained by the pyramid analysis, and a sequence of level j high frequency $L_0$, level j+1 mild frequency $L_1$, and level j+2 low frequency $L_2$ is also obtained through the pyramid analysis.

Figure 7:
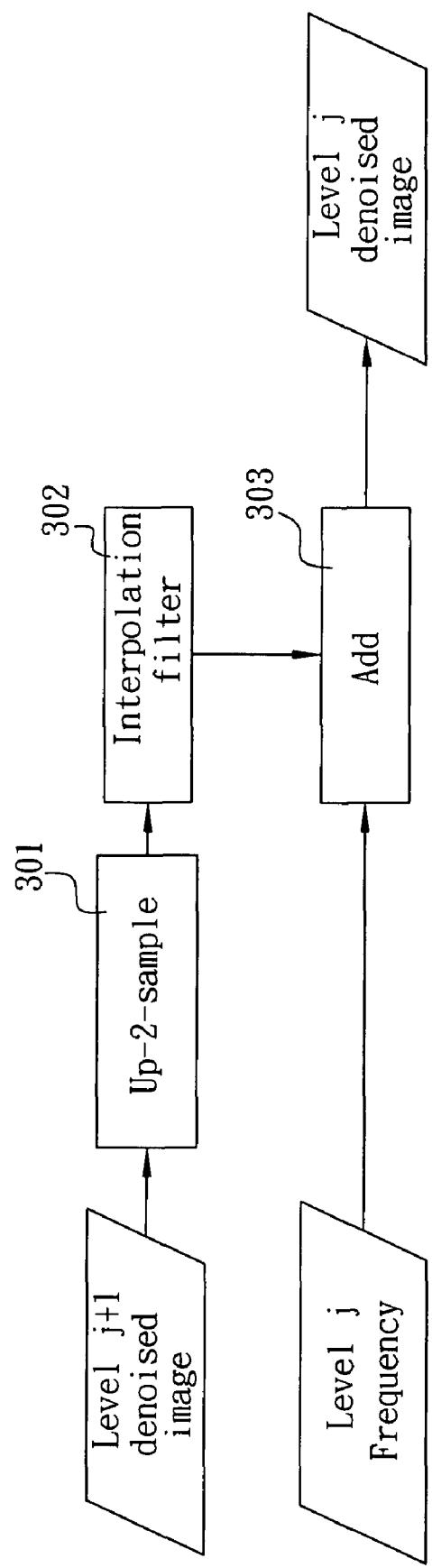
FIG. 7 is a schematic view of pyramid synthesis in the denoise method according to the present invention.

In the pyramid analysis/synthesis algorithm, the pyramid synthesis is just used to reverse some of the steps of the pyramid analysis, as referring to FIGS. 5 and 7, and comprises the following steps:

(301) up-sampling a Level j+1 denoised image $g_1$ with the resolution of M*N/4 pixels by a second expand filter 104 through using a factor of 2 to zoom out the Level j+1 denoised image $g_1$ two times;

(302) creating an up-sampled Level j+1 denoised image $g_1$ with the same resolution of M*N pixels as the original input image $g_0$ by the second expand filter 104 through using a second interpolation, wherein the up-sampled Level j+1 denoised image $g_1$ is a second Level j prediction image of the original input image $g_0$; and (303) adding the second Level j prediction image to an output of a noise filter 105 which is used to filter the level j (j=0) high frequency $L_0$ so as to reconstruct and output a Level j denoised image $g_0$.

By repeating the above iterative steps several times, a sequence of Level j denoised image $g_0$, Level j+1 denoised image $g_1$, Level j+2 denoised image $g_2$, and Level j+3 denoised image $g_3$ is obtained by the pyramid synthesis. According to the above, the pyramid analysis/synthesis algorithm is able to reconstruct and output the Level j (j=0) denoised image $g_0$ when the Level j+1 denoised image $g_1$ and Level j high frequency $L_0$ are obtained in a previous iterative procedure.

In the embodiment of the present invention, we suppose that $\{I_{k,l}^j\}$ is the Level j approximation image, and $\{w_{m,n}\}$, $\{w_{m,n}'\}$ are respectively the reduce filter and expand filter. Then the Level j+1 approximation image is:

$$I_{k,l}^{j+1} = \sum_{m,n} w_{m,n} I_{2k+m,2l+n}^j$$

The Level j prediction image is:

$$P_{k,l}^{j+1} = 4\sum_{m,n} w_{m,n}' I_{(k+m)/2,(l+n)/2}^{j+1}, \text{ here } (k+m)/2, (l+n)/2 \text{ are intergers.}$$

With respect to the image pyramid, we use the same factor for both the reduce filter and expand filter, which means both filters for creating images by using approximation and interpolation methods are symmetric and separable. That is:

$$w_{m,n} = w_{m,n}' = w_m * w_n * m, n \in [-2,2]$$

Figure 8:
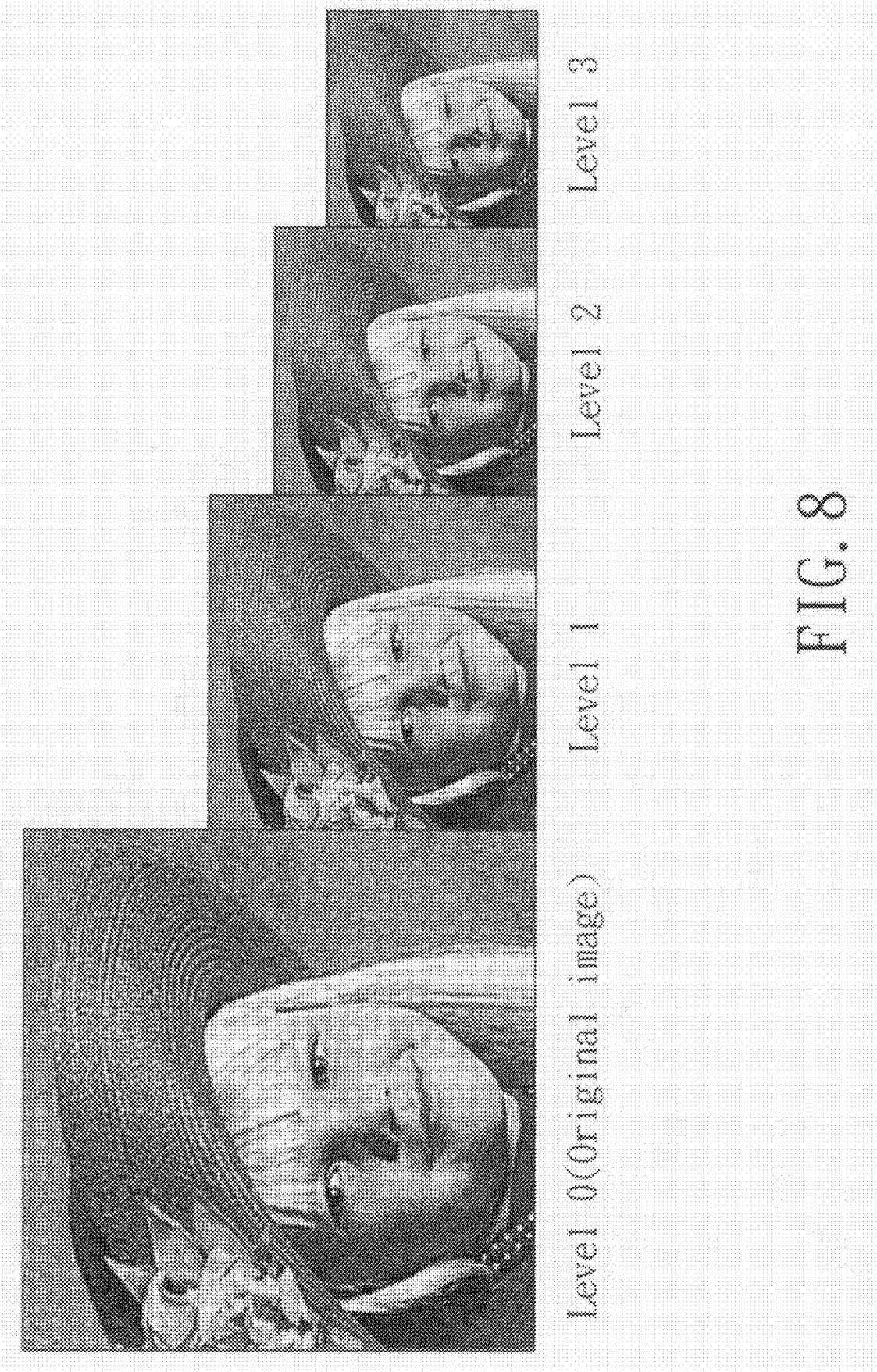
FIG. 8 is an example of Gaussian pyramid of an original input image.
Figure 9:
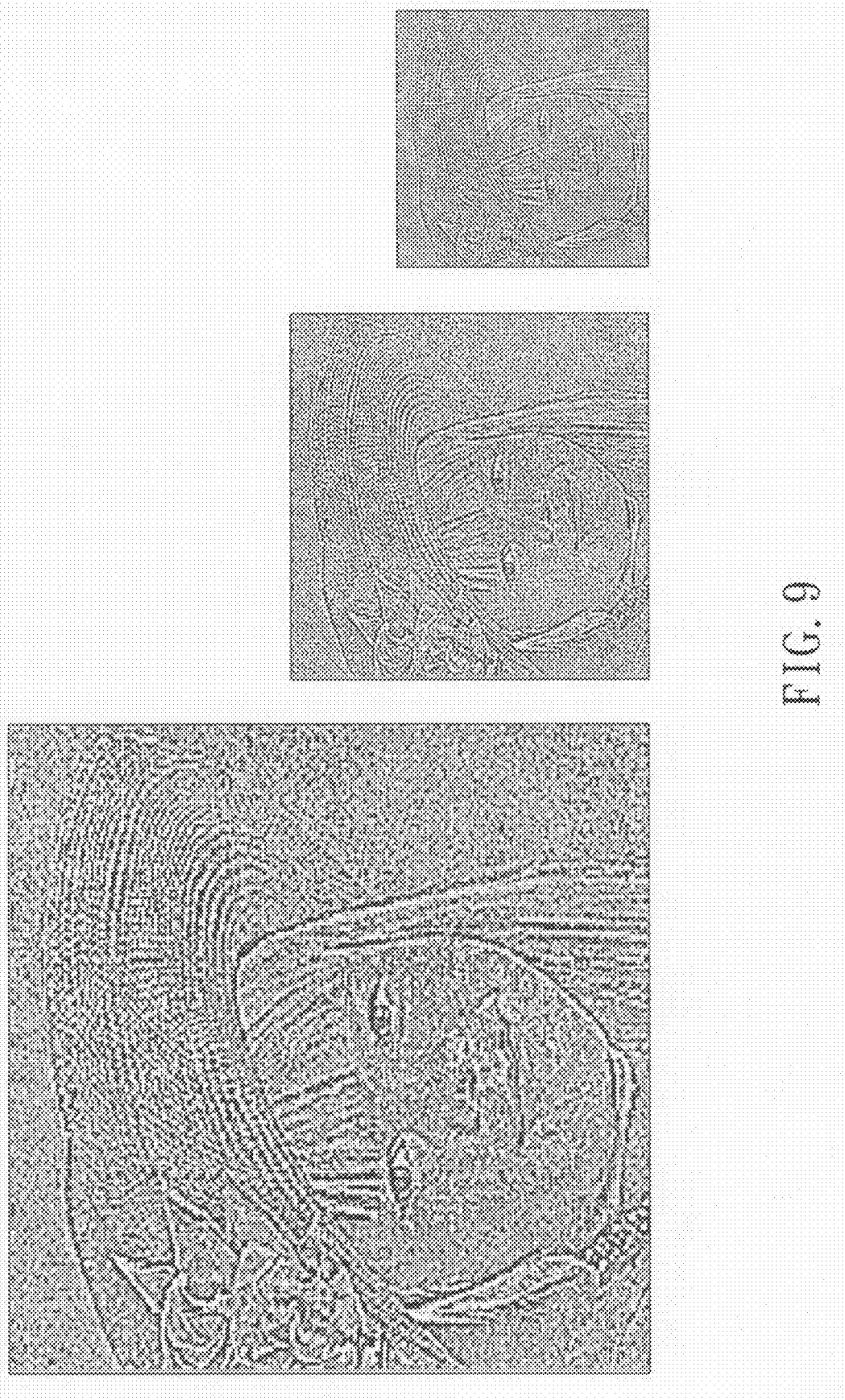
FIG. 9 is an example of the corresponding Laplacian Pyramid of the original input image shown on FIG. 8.

Especially:

$$w_0 = \alpha \cdot \frac{1}{4} \leq \alpha \leq \frac{1}{2}$$

$$w_{-1} = w_1 \cdot \frac{1}{4}$$

$$w_{-2} = w_2 = \frac{1}{4} - \alpha/2$$

where Level 0 approximation image is regarded as the original input image and an analysis of 3 levels is selected in this embodiment, and the α is usually ½ to distribute detailed message averagely on each level. An example of Gaussian pyramid of an original input image is illustrated on FIG. 8, and the corresponding Laplacian pyramid of the original input image is illustrated on FIG. 9.

Within the frame work of the denoise method according to this embodiment, as referring to FIG. 5, the noise filter 105 in each iterative procedure includes the MMSE filter and NL filter. The NL algorithm of the NL filter itself provides a powerful tool for removing gauss noise, however, it is too computationally demanding to be implemented to practical application. Moreover, it is weak to non-gauss noise. After the NL algorithm is optimized, it will perform just like local means algorithm, which causes detail blur and canvas phenomenon.

Figure 10:
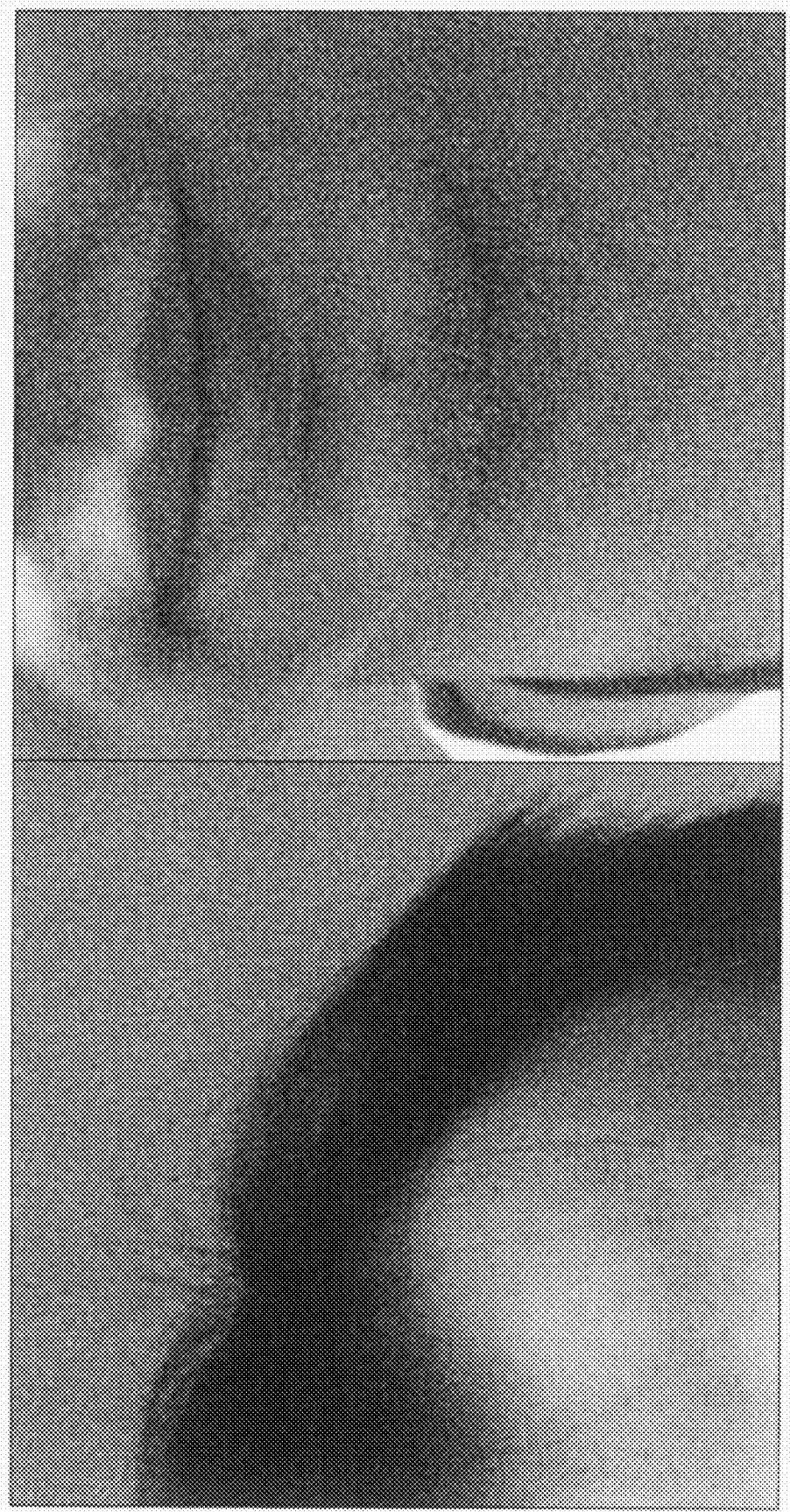
FIG. 10 illustrates two sub-images obtained from a same original image with severe noise.
Figure 11:
FIG. 11 illustrates two sub-images obtained from the original image shown on FIG. 10 after using NL algorithm to denoise the original image.
Figure 12:
FIG. 12 illustrates two sub-images obtained from the original image shown on FIG. 10 after using the denoise method of the present invention to denoise the original image.

Referring to FIG. 10, it illustrates two sub-images from a same original image with severe noise. After using the NL algorithm to denoise the original image, the two sub-images of the denoised image are shown as FIG. 11, where the details of hair in the first sub-image have been blurred, and the second sub-image like a canvas. In order to save more details and improve the results, the present invention further optimizes the NL algorithm applied to the image pyramid. As a direct result, we can see from FIG. 12 that the details of hair will be fully saved and, at the same time, the canvas phenomenon will disappear. The NL filter is a litter slow, but with good noise removed result.

The NL algorithm being utilized in the present invention and applied to the image pyramid firstly supposes that $\{I_{i,j}\}$ is the original input image, $\{w_{m,n}\}$ is a NL filter, and $\{I_{i,j}^*\}$ is the filtered image. Then:

$$I_{p,q}^* = \sum_{(i,j) \in \Omega} w_{i,j} I_{i,j}$$

Here $\Omega$ is a neighbor of (p,q) named as search window.

With respect to the optimized NL algorithm, the NL filter can be denoted as:

$$w_{i,j} = \frac{1}{M} \exp\left(\frac{\|A_{i,j} - A_{p,q}\|^2}{\delta^2}\right)$$

Here $$M = \sum_{i,j \in \Omega} \exp\left(\frac{\|A_{i,j} - A_{p,q}\|^2}{\delta^2}\right)$$

so that $$\sum_{i,j} w_{i,j} = 1.$$

And $\delta$ is a parameter to denote the noise level of point (p,q). $A_{i,j}, A_{p,q}$ are small neighbor of (i,j) and (p,q) to compare the similarity of $I_{i,j}$ and $I_{p,q}$, which are called compare windows.

Usually we define the compare window $A_{i,j}$ as a rectangle window with radius 3 and center (i, j). Then we define:

$$\|A_{p,q} - A_{i,j}\|^2 = \sum_{m,n \in [-3,3]} |V_{p+m,q+n} - V_{i+m,j+n}|^2$$

Here $\{V_{i,j}\}$ is a reference image to compute the weight. On traditional NL algorithm, $\{V_{i,j}\}$ is the same as $\{I_{i,j}\}$.

While applying the NL algorithm to the image pyramid, we will select $\{I_{i,j}\}$ as the frequency image to each level, and $\{V_{i,j}\}$ as the corresponding approximation image to use color message. The Search window $\Omega$ is selected as a rectangle window with radius from 3 to 12. In the NL algorithm implemented in this embodiment, the minimal radius 3 is selected to make this algorithm run faster and obtain the denoised result better than the original NL algorithm, since the original NL algorithm requests a longer radius, such as 12 (Referring to FIG. 12, where we used a search window with radius 3).

In this embodiment, the MMSE filter used in the noise filter 105 in each iterative procedure is:

$$f^*(p) = \begin{cases} \bar{f}(p) + \frac{Var(p) - N(p)}{Var(p)}(f(p) - \bar{f}(p)) & Var(p) > N \\ \bar{f}(p) & Var(p) \leq N \end{cases}$$

, where f(p) is current pixel value on image to be filtered; f*(p) is the filtered pixel value; $\bar{f}$(p) is the average value of a neighbor of pixel p; Var(p) is the variance of the neighbor of pixel p; and N(p) is the expected noise value of pixel p. The MMSE filter is fast and can be easily embedded in mobile and handheld devices.

In most denoising work, the noise level is often assumed to be known as AWGN (additive white Gaussian noise), of which the channel model is one in which the only impairment is the linear addition of wideband or white noise with a constant spectral density (expressed as watts per hertz of bandwidth) and a Gaussian distribution of amplitude. The model does not account for the phenomena of fading, frequency selectivity, interference, nonlinearity or dispersion. However, it produces simple, tractable mathematical models which are useful for gaining insight into the underlying behavior of a system before these other phenomena are considered. However, we found the noise from CCD camera is not additive and the noise level is really unknown, depending on the camera and setting such as ISO, shudder speed and aperture. Moreover, with color space conversion, the noise level will be more complicated.

Usually the noise level is strongly dependent on the image intensity level. We call the noise level as a function of image intensity or the noise level function (NLF). Conventionally, a Columbia camera response function database is used to model the NLF by using principal components and bounds on derivatives. However, this way is computationally demanding and still some images won't satisfy this model.

Figure 14:
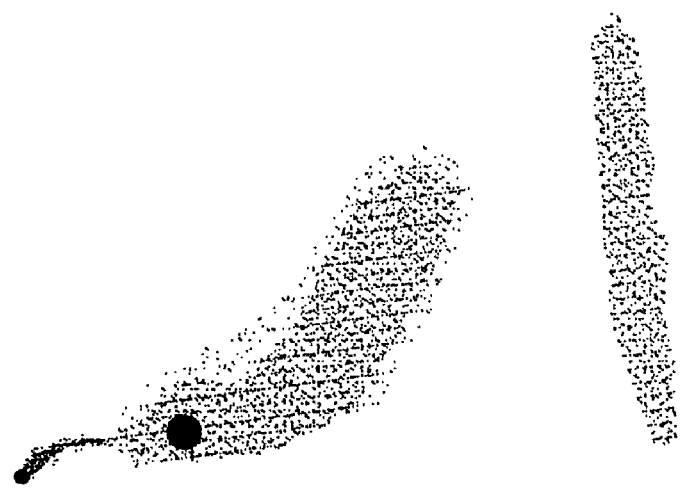
FIG. 14 is a schematic view of a two-dimensional Luminance-Variance distribution table according to the present invention.
Figure 15:
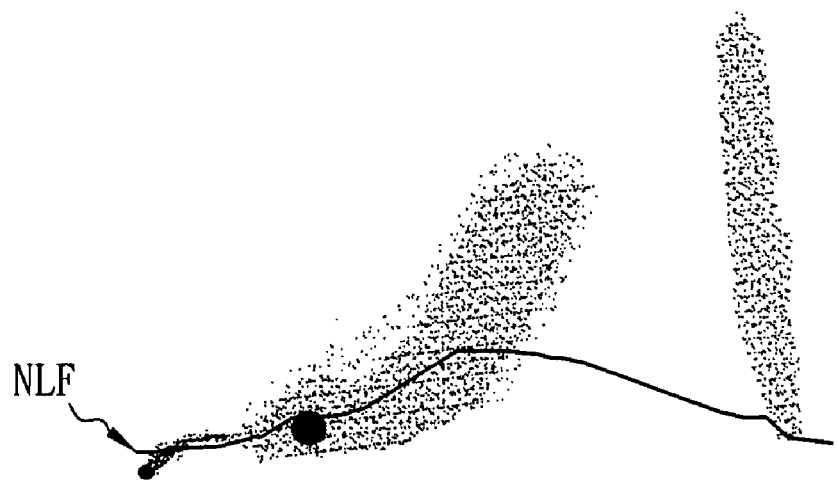
FIG. 15 is a schematic view of the Luminance-Variance distribution table with a white line representing the resulted NLF according to the present invention.

In this embodiment of the present invention, in order to find the parameter δ of noise level used by the NL filter in the noise filter within each iterative procedure, an auto-adaptive noise estimation algorithm on pyramid for estimating NLF without using any noise model is introduced, which is very intuitionistic and fast. In this embodiment, NLF of three channels all relate to the luminance channel. However, as to the color channels, we suppose that the approximation image is the corresponding luminance image, and will only discuss color space with a luminance channel and two color channels, for instance YCbCr and LAB color spaces. Besides, we suppose that the noise level to each pixel is a constant on color channels or the same as luminance channel. Although the auto-adaptive noise estimation algorithm introduced in this embodiment is very coarse, it still gain satisfying denoised results on the nature color images. With respect to each level of pyramid, it uses a pair of approximation image and frequency image, both with the same size, and estimates the NLF by using the following steps:

(401) scanning the whole image and creating a two-dimensional Luminance-Variance distribution table α[I][V] with I∈[0,255], V∈[0,$V_{Max}$], where I is the luminance level and V is the variance, and initializing all cell of this table to 0; FIG. 14 illustrates the Luminance-Variance distribution table, wherein the x-axis represents the Luminance level, the y-axis represents the Variance, and the Value described by coordinates (x0, y0) represents the number of blocks which satisfies: Luminance=x0, Variance=y0, and also means that more white points on FIG. 14 denote more blocks;

(402) procuring each pixel on approximation image and frequency image respectively;

(403) computing the average I of the neighbor of current pixel procured from the approximation image;

(404) computing the variance V of the neighbor of current pixel procured from the frequency image;

(405) increasing by one pixel at the corresponding cell α[I][V], and determining whether or not the computed variance V is more than $V_{max}$; if yes, simply ignoring it and continuing the following steps; otherwise, looping back to step (402);

(406) procuring each average I from 0 to 255;

(407) finding background noise variance V or the maximal cell value α[I][V] from array {α[I][V]} at each luminance level I, and increasing by one luminance level I, and then determining whether or not the luminance level I is more than 255; if yes, obtaining an initial NLF:I→$V_1$ simply by selecting the variance value with max block number on each Luminance and continuing the following steps; otherwise, looping back to step (406);

(408) finding the main background noise variance $V_0$ at luminance $I_0$. So that α[$I_0$][$V_0$] is the maximum on the whole table. Since the pure noise image area with the same luminance level has every probability of the same variance, at most nature images this maximum denotes the background area in an image; and (409) correcting the NLF obtained in Step (407) by using {$I_0$, $V_0$}. It is supposed that the noise level at the adjacent luminance levels will be close too, that is, NLF must be smooth.

Figure 13:
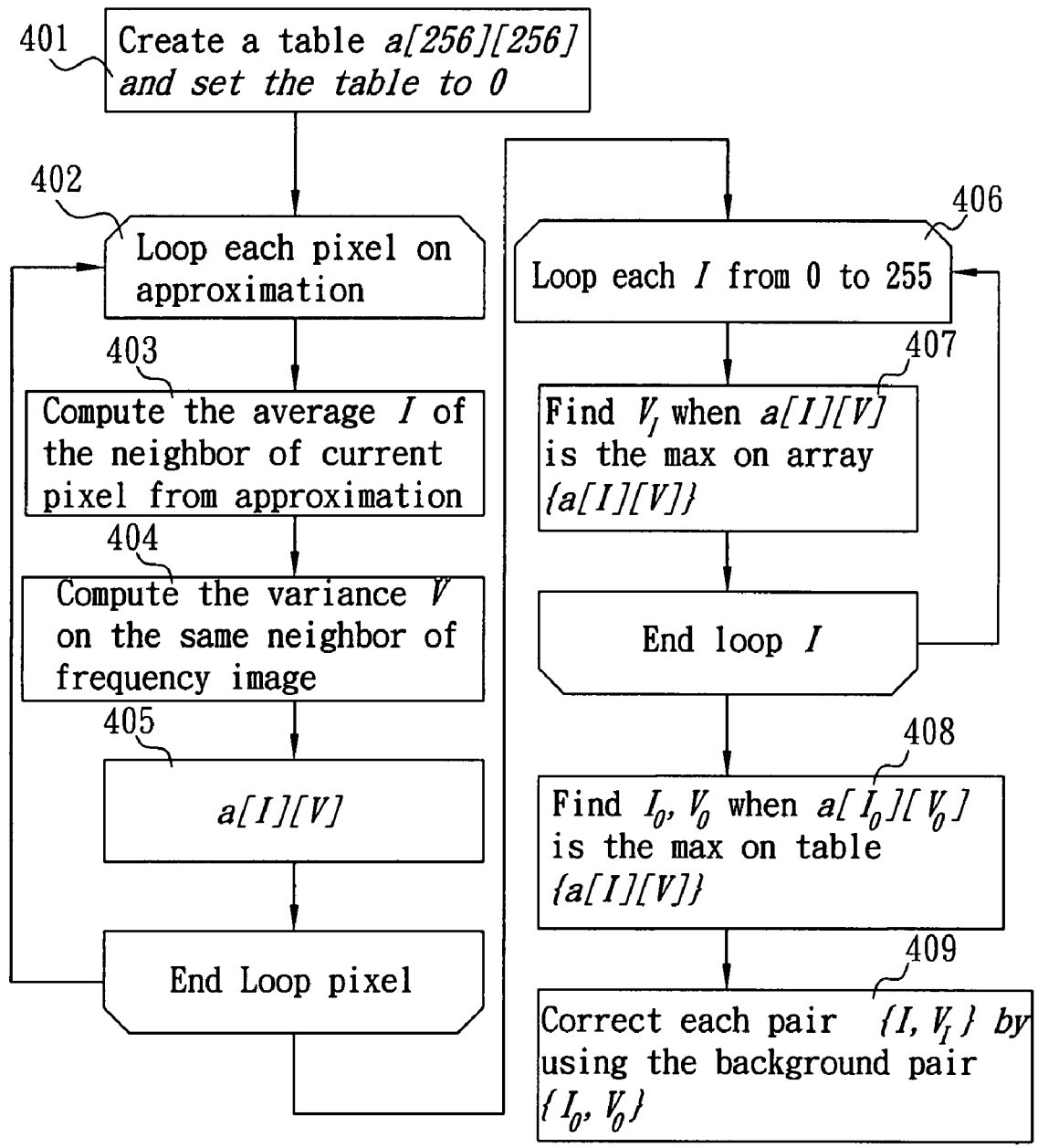
FIG. 13 is a schematic view of an auto-adaptive noise estimation algorithm in the denoise method according to the present invention.

The noise estimation algorithm will discard some points (x, y) on initial NLF not smooth, and renew these pairs x and y with interpolation between adjacent pairs. In the embodiment of the present invention, the noise estimation algorithm finds the point (x, y) in the Luminance-Variance distribution table with the maximum block number on initial NLF at first, this point is regarded as the most trusty, and then cancels other points on the initial NLF which differ too much to the maximum pair. These canceled points can be interpolated back smoothly by the remained points as described in the steps (408) and (409) to obtain a white line representing the resulted NLF as shown on FIG. 13.

Summing up the above, the denoise method on image pyramid described in the present invention is easy to be implemented to the mobile or handheld devices for obtaining better noise removing and anti-shaking results and removing noise much faster than all current commercial denoise software, but only with less quality loss.

While the invention herein disclosed has been described by means of specific embodiments, numerous modifications and variations could be made thereto by those skilled in the art without departing from the scope and spirit of the invention set forth in the claims.

What is claimed is:

1. A denoise method on image pyramid, which is implemented to mobile or handheld devices, comprising:

a pyramid analysis/synthesis algorithm, comprising pyramid analysis and pyramid synthesis in a plurality of iterative procedures respectively wherein, in each iterative procedure, the pyramid analysis is used to create a Level j+1 approximation image by down-sampling a Level j image, create a first Level j prediction image by up-sampling the Level j+1 approximation image through using a first interpolation, and compute the difference between the first Level j prediction image and the Level j image for obtaining a level j frequency image, and the pyramid synthesis is used to create a second Level j prediction image by up-sampling a Level j+1 denoised image and create a Level j denoised image by adding the second Level j prediction image to an output of a noise filter which is used to filter the level j frequency image;

non local (NL) filter and minimum mean square error (MMSE) filter, included in the noise filter in each iterative procedure for removing gauss noise existing in the level j frequency image; and an auto-adaptive noise estimation algorithm in each iterative procedure for finding parameter of noise level used by the NL filter.

2. The method of claim 1 wherein NL filter is denoted as {$w_{m,n}$}:

$$w_{i,j} = \frac{1}{M}\exp\left(\frac{\|A_{i,j} - A_{p,q}\|^2}{\delta^2}\right)$$

where $$M = \sum_{i,j\in\Omega}\exp\left(\frac{\|A_{i,j} - A_{p,q}\|^2}{\delta^2}\right)$$

so that $$\sum_{i,j} w_{i,j} = 1;$$

δ is a parameter to denote the noise level of point (p,q); $A_{i,j}$, $A_{p,q}$ are compare windows and small neighbor of (i,j) and (p,q) to compare the similarity of $I_{i,j}$ and $I_{p,q}$, {$I_{i,j}$} is the original input image, {$I_{i,j}^*$} is the filtered image, thus $$I_{p,q}^* = \sum_{(i,j)\in\Omega} w_{i,j} I_{i,j}$$

here Ω is a neighbor of (p,q) named as search window.

3. The method of claim 2 wherein the compare window $A_{i,j}$ is a rectangle window with radius 3 and center (i, j) that:

$$\|A_{p,q} - A_{i,j}\|^2 = \sum_{m,n\in[-3,3]} |V_{p+m,q+n} - V_{i+m,j+n}|^2$$

here {$V_{i,j}$} is a reference image to compute weight.

4. The method of claim 3 wherein {$I_{i,j}$} is the frequency image to each level, and {$V_{i,j}$} is the corresponding approximation image to use color message.

5. The method of claim 2 wherein the Search window Ω is selected as a rectangle window with radius from 3 to 12.

6. The method of claim 1 wherein the MMSE filter is denoted as:

$$f^*(p) = \begin{cases} \overline{f}(p) + \dfrac{Var(p) - N(p)}{Var(p)}(f(p) - \overline{f}(p)) & Var(p) > N \\ \overline{f}(p) & Var(p) \le N \end{cases}$$

where f(p) is current pixel value on image to be filtered; f*(p) is the filtered pixel value; $\overline{f}(p)$ is the average value of a neighbor of pixel p; Var(p) is the variance of the neighbor of pixel p; and N(p) is the expected noise value of pixel p.

7. The method of claim 1 wherein the parameter of noise level is a noise level function (NLF) estimated by the auto-adaptive noise estimation algorithm comprising the steps of:
   scanning the image and creating a two-dimensional Luminance-Variance distribution (L-V) table, wherein the L-V table is denoted as α[I][V] with I∈[0,255], V∈[0, $V_{Max}$], where I is the luminance level and V is the variance;
   creating an initial NLF from the L-V Table; and
   correcting the initial NLF to obtain a smooth line representing a resulted NLF.

8. The method of claim 7, when creating the L-V table, further comprising the steps of:
   initializing all cell of the L-V table to 0;
   procuring each pixel on the approximation image and frequency image respectively;
   computing the average I of the neighbor of current pixel procured from the approximation image;
   computing the variance V of the neighbor of current pixel procured from the frequency image; and
   increasing by one pixel at the corresponding cell α[I][V], and determining whether or not the computed variance V is more than $V_{Max}$; when the determination is positive, simply ignoring the computed variance V and continuing the subsequent steps; otherwise, looping back to procure next pixel.

9. The method of claim 8, when creating the initial NLF, further comprising the steps of:
   procuring each average I from 0 to 255;
   finding background noise variance V or the maximal cell value α[I][V] from array {α[I][V]} at each luminance level I; and
   increasing by one luminance level I, and then determining whether or not the luminance level I is more than 255; if yes, obtaining an initial NLF simply by selecting the variance value with max block number on each Luminance and continuing the subsequent steps; otherwise, looping back to procure next luminance level I.

10. The method of claim 9, when correcting the initial NLF to obtain the resulted NLF, further comprising the steps of:
    finding the main background noise variance $V_0$ at luminance $I_0$; and
    finding the point in the L-V table with the maximum pair on the initial NLF by using $\{I_0, V_0\}$;
    canceling other points on the initial NLF which differ too much to the maximum pair; and
    interpolating the canceled points back to the L-V table by using the remained points to obtain the smooth line representing the resulted NLF.

* * * * *